(12) United States Patent
Raman et al.

(10) Patent No.: US 8,060,489 B1
(45) Date of Patent: *Nov. 15, 2011

(54) COMPUTER-IMPLEMENTED INTERACTIVE, VIRTUAL BOOKSHELF SYSTEM AND METHOD

(75) Inventors: Tiruvilwamalai Venkatraman Raman, San Jose, CA (US); Mukkai S. Krishnamoorthy, Troy, NY (US)

(73) Assignee: Google, Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/847,799

(22) Filed: Jul. 30, 2010

Related U.S. Application Data (63) Continuation of application No. 11/598,107, filed on Nov. 13, 2006, now Pat. No. 7,778,994.

(51) Int. Cl.
 *G06F 17/30* (2006.01)
(52) U.S. Cl. ........ 707/706; 707/707; 707/715; 707/716; 707/754
(58) Field of Classification Search ........... 707/706–754
 See application file for complete search history.

(56) References Cited

U.S. PATENT DOCUMENTS

| | | | |
|---|---|---|---|
| 5,699,526 A | 12/1997 | Siefert | |
| 6,292,827 B1 | 9/2001 | Raz | |
| 6,557,054 B2 | 4/2003 | Reisman | |
| 6,633,873 B1 | 10/2003 | Nakamura | |
| 6,768,982 B1 | 7/2004 | Collins et al. | |
| 7,162,488 B2 * | 1/2007 | DeVorchik et al. | 1/1 |
| 7,240,292 B2 | 7/2007 | Hally et al. | |
| 7,251,647 B2 | 7/2007 | Hoblit et al. | |
| 7,496,560 B2 * | 2/2009 | Manber et al. | 1/1 |
| 2002/0184107 A1 * | 12/2002 | Tsuda et al. | 705/26 |
| 2005/0256867 A1 | 11/2005 | Walther et al. | |
| 2006/0069675 A1 * | 3/2006 | Ogilvie | 707/3 |
| 2006/0265640 A1 | 11/2006 | Albornoz et al. | |
| 2007/0050406 A1 * | 3/2007 | Byers | 707/104.1 |
| 2007/0136177 A1 | 6/2007 | Reeth et al. | |

OTHER PUBLICATIONS

Search Report and Written Opinion for International Application No. PCT/US2007/023697 mailed Jun. 6, 2008, 8 pgs.
Mitchell et al, "iVia Open Source Virtual Library System", D-Lib Magazine Corporation for National Research Initiatives USA, vol. 9, No. 1, Jan. 2003, XP002481126, ISSN: 1082-9873, 15 pgs.
Kikuchi, H., et al., User interface for a digital library to support construction of a "virtual personal library", *Proceedings of the Third IEEE International Conference on Multimedia Computing and Systems*, 1996, pp. 429-432, ACM, New York.

* cited by examiner

*Primary Examiner* — Hanh Thai
(74) *Attorney, Agent, or Firm* — Sterne, Kessler, Goldstein & Fox P.L.L.C.

(57) ABSTRACT

A computer-implemented method and system for realizing an interactive, virtual bookshelf representing physical books and digitally stored books of the user. Using a search query, the Web is searched using search metadata to identify a desired book. Library metadata corresponding to the physical books and digitally stored books of the user is then searched using the search metadata to determine whether the desired book is present in the virtual on-line bookshelf. Results indicative of whether the desired book is present on the virtual on-line bookshelf can be displayed.

21 Claims, 7 Drawing Sheets

| (1) Author 202 | (2) Title 204 | (3) ISBN (and Other Cataloging Information) 206 |
| --- | --- | --- |
| (4) Language 208 | (5) Publisher Information 210 | (6) Format of Copy – Physical; Digital/Electronic 212 |
| (7) Publication Date 214 | (8) Publisher Location 216 | (9) Copyright Information / Copying Rights 218 |
| (10) User Notes 220 | (11) User-Applied Labels 222 | (12) When Book Acquired 224 |
| (13) Price or Cost 226 | (14) How Book Acquired 228 | (15) Current Status of Copy 230 |
| (16) Links to Other Reviews 232 | (17) Personal Annotation 234 | (18) Bookmarks and Cites to Book Content 236 |
| (19) Other Data and Information 238 | | |

COMPUTER-IMPLEMENTED INTERACTIVE, VIRTUAL BOOKSHELF SYSTEM AND METHOD

CROSS-REFERENCE TO RELATED APPLICATIONS

This application is a continuation of U.S. patent application Ser. No. 11/598,107, filed Nov. 13, 2006, which is incorporated herein by reference in its entirety.

BACKGROUND OF THE INVENTION

1. Field of the Invention

The present invention relates generally to physical books, online digitally stored books, and Web-based search.

2. Background Art

Paper copies of books (physical books) have existed since before the invention of the printing press. Libraries throughout recorded history have housed collections of physical books in the form of printed books and hand written manuscripts. Access to these libraries has been limited because the actual physical book must be housed in one physical location and the user must be provided access to and possession of the desired physical book in order to gain access to its contents.

With the emergence of the Internet, the availability of physical books has increased. For example, locating a physical copy of a physical book has become easier with the advent of on-line search facilities of physical books such as Amazon and EBay. New and used physical copies of desired physical books can be purchased or leased by users remotely and then shipped to the purchasing user by post or other delivery service mechanism. Thus the universe of physical books available to the user has expanded dramatically from the days of brick and mortar book stores and sellers, and reserved and lending libraries.

Additionally, publishers such as O'Reilly have created digitally stored books that can be accessed by a user on-line over the Internet either for no charge or based on a subscription model or for the fixed fee. Electronic copies of such digitally stored books can often be downloaded to the user over the Internet for electronic storage on the computer system of the user or printed out in hard copy form.

On-line search over the public Web, universal book search engines or proprietary on-line collections allows for desired information to be located in a vast, ever expanding universe of books whose data and/or metadata is made available for search. Often, specific desired content or information can be pinpointed in the book using such electronic searching.

The information explosion that has occurred has made it increasingly difficult for the owner of a library of books (either in physical copy or digitally stored) to keep track of what is in her library or to determine which books contain desired information.

BRIEF SUMMARY OF THE INVENTION

The present invention realizes an interactive, virtual bookshelf representing physical books and digitally stored books.

In an embodiment, a computer-implemented method includes the steps of receiving a search query to specify a desired book, initiating a search using the search query to locate one or more books corresponding to the search query, and producing search metadata corresponding to a desired book. Further steps are filtering library metadata corresponding to the physical books and the digitally stored books with the search metadata to determine whether the desired book is present in a virtual bookshelf, and outputting the results of the filtering indicative of whether the desired book is present on the virtual bookshelf. In this way, the results indicative of whether the desired book is present can be displayed on an interactive, virtual bookshelf.

In other embodiments, a computer-implemented method for realizing an interactive, virtual bookshelf representing physical books and digitally stored books further includes steps of outputting results of a filtering step indicative of whether a desired book is present or absent on the virtual on-line bookshelf, and providing the capability to a user, after the outputting step indicates that the desired book is absent on the virtual on-line bookshelf, to search the web. In one example, this search can be to locate an available copy of the physical book or the digitally stored book corresponding to said desired book. In another example, this search can be to locate any copies of the physical book or the digitally stored book corresponding to said desired book.

In another embodiment, a system for realizing an interactive, virtual bookshelf representing physical books and digitally stored books over a network is provided. The system includes a client having a browser, and a server coupled over a network. The server receives a search query to specify a desired book from the browser, initiates a search using the search query to locate one or more books corresponding to the search query, and produces search metadata corresponding to a desired book. The server filters library metadata corresponding to the physical books and the digitally stored books with the search metadata to determine whether the desired book is present in a virtual bookshelf, and outputs the results of the filtering indicative of whether the desired book is present on the virtual bookshelf to the browser. In this way, the browser can output a user-perceptible representation of the interactive, virtual bookshelf including the results indicative of whether the desired book is present.

In a further embodiment, a system for realizing an interactive, virtual bookshelf representing physical books and digitally stored books includes means for receiving a search query to specify a desired book, means for initiating a search using the search query to locate one or more books corresponding to the search query, and means for producing search metadata corresponding to a desired book. The system further includes means for filtering library metadata corresponding to the physical books and the digitally stored books with the search metadata to determine whether the desired book is present in a virtual bookshelf and means for outputting results of the filtering indicative of whether the desired book is present on the virtual bookshelf, whereby the results can be displayed on an interactive, virtual bookshelf.

One feature of a virtual bookshelf and its operation is in the midst of the information explosion that has occurred. An owner of a library of books (either in physical copy or digitally stored) can now keep track of what is in his or her library or determine which books contain desired information.

Further embodiments, features, and advantages of the invention, as well as the structure and operation of the various embodiments of the invention are described in detail below with reference to accompanying drawings.

BRIEF DESCRIPTION OF THE FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

Figure 1:
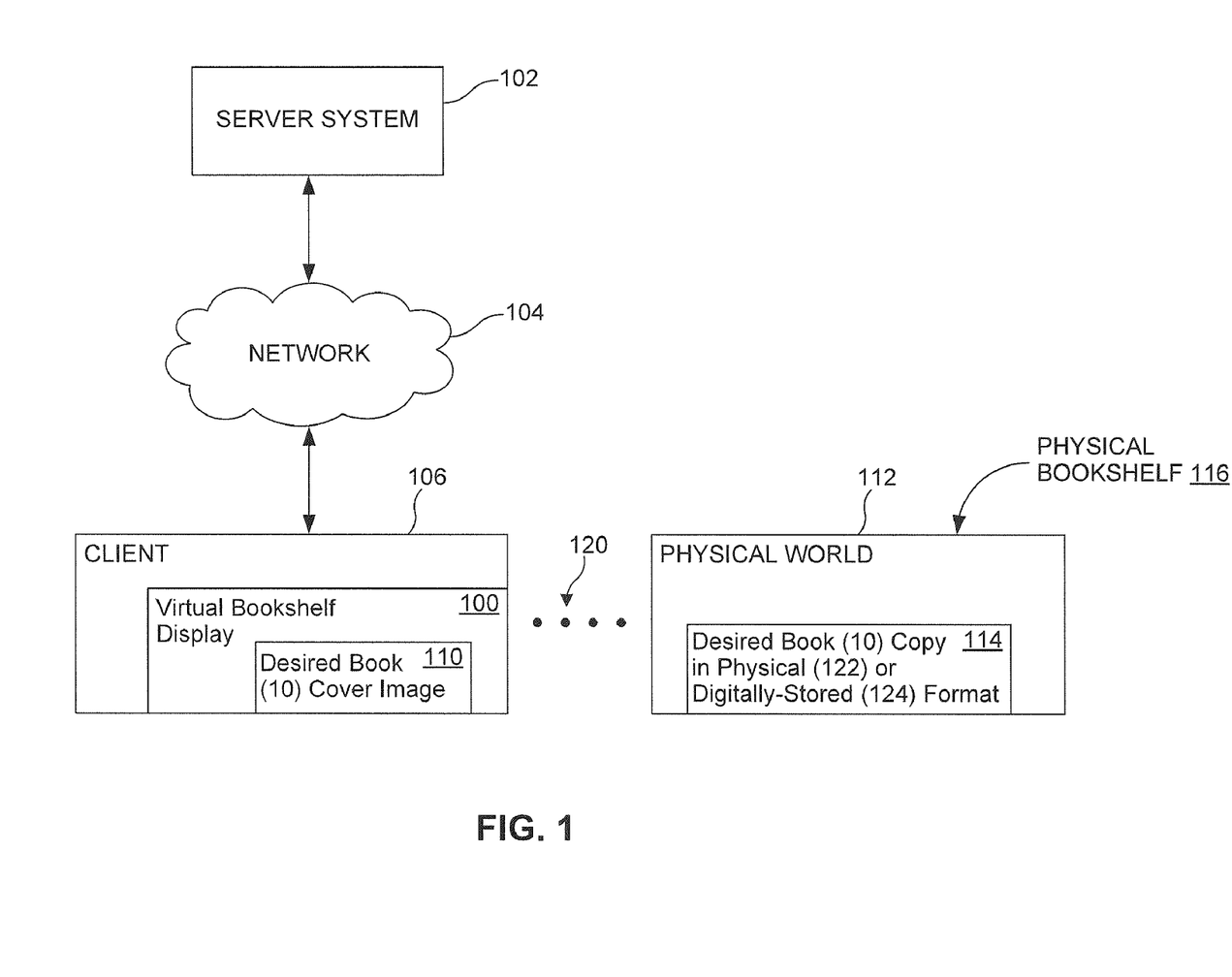
FIG. 1 is a diagram of the network environment and physical environment incorporating a virtual bookshelf according to an embodiment of the present invention.

The present invention as shown generally in FIG. 1 is an interactive, virtual bookshelf 100 (referred to herein as "virtual bookshelf") for the user (client) of a computer-based device or gadget 106 that can be connected on demand to the Internet 104 for on-line operation. The virtual bookshelf 100 is also called an on-line personal bookshelf that uses on-line search (see FIG. 5) to help a user find if a desired or correct book 10 is in or on his or her physical bookshelf 116. The virtual bookshelf provides a strong connection (indicated by large dots 120) between the electronically connected on-line world 102, 104, 106 and the non-connected physical world 112. It allows a user to electronically search data and metadata of books (See FIG. 5) to locate a desired (or correct) book(s) 10 and then determine if the user has the desired book 10 on a virtual bookshelf 100.

Figure 5:
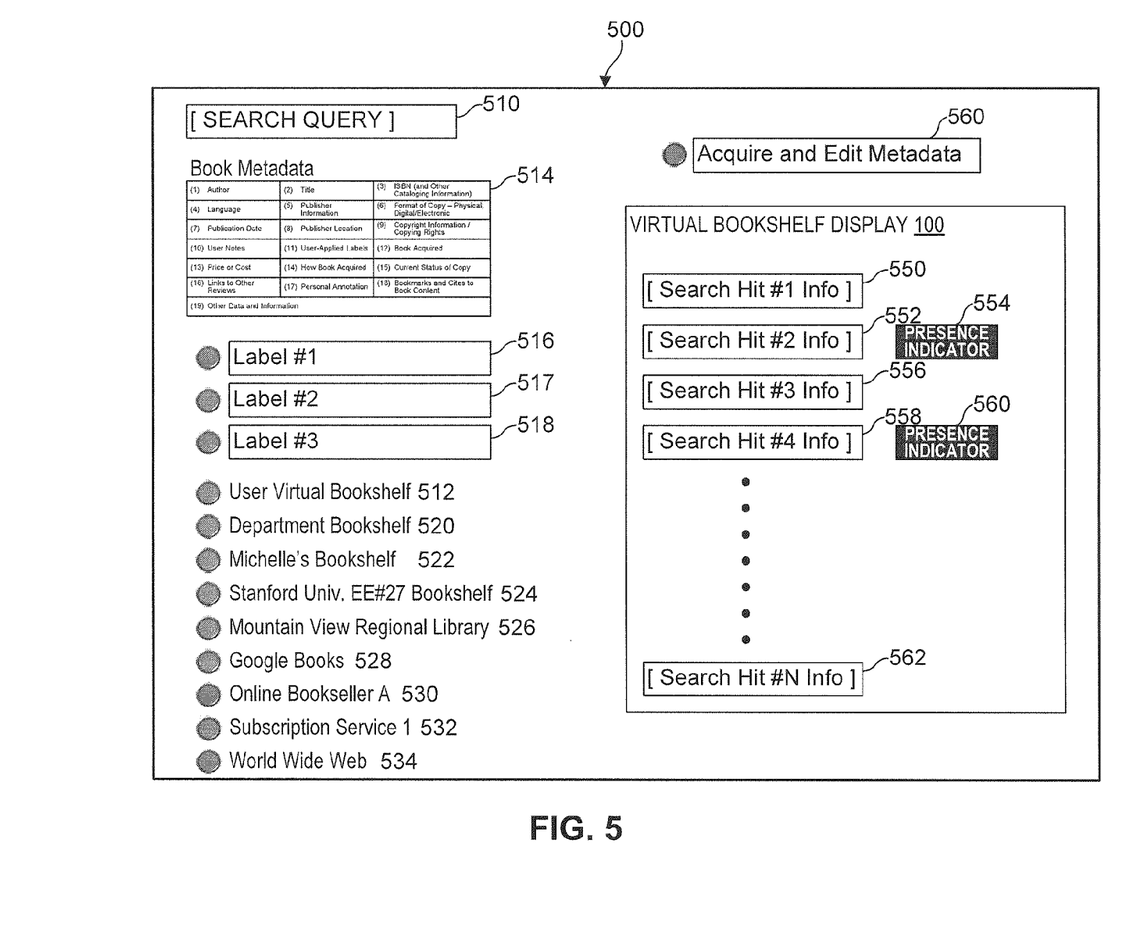
FIG. 5 is a display of a user home page.

As shown in FIG. 5, the search hits 550, 552, 556, 558, 562 of desired books 10 from a search can be indicted to the user in any desired fashion, such as using graphically icons 554, 560 or representations of the book cover 110, or audibly by changing the aural emphasis (not shown). The metadata of books 200 that the user has added to his or her virtual bookshelf 100 as it has been built by the user can be added automatically or manually, and the user can supplement or annotate that data. The virtual bookshelf 100 allows the user to connect by on-line (electronic) search 304 the atoms of the physical world 112 of his or her books 114 in a physical bookshelf 116 with the bits of his or her virtual collection of books which make up the virtual bookshelf 100. The virtual bookshelf 100 is built by the user as he or she acquires or gains access to physical books 122 and digitally stored books 124 in or on his or her physical bookshelf 116 or library. The virtual bookshelves of others as well as on-line proprietary collections and libraries can be searched where access is provided, as shown graphically in FIG. 5. This allows for the creation of shared, on-line virtual bookshelf communities. The user as indicated by block 310 of FIG. 3 can obtain copies of desired books 10 not present in the virtual bookshelf 100 by purchase or loan if desired.

The virtual bookshelf 100 can be implemented in a variety of four's, including as part of on-line search over the Web cloud 104, a gadget 702 downloaded to the user computer or device, or as part of on-line book search or shopping 706.

As used herein, the teens "book" or "books" 10 includes a book(s), a magazine(s), a newspaper(s) and other print artifact(s) of any current or future developed form or configuration. A book 10 can be a physical book 122, which means a book in hard copy form of traditional configuration. Such a physical book 122 is often printed or scanned on to a paper or other tangible medium of expression, but virtual bookshelf 100 contemplates any physical manifestation currently available or developed in the future. Books can also be digitally stored books 124, which means books 10 that are stored electronically in soft copy digital form using any current or future developed storage medium, device or approach. Digitally stored books 124 are also referred to herein as electronic information including digitized works.

Figure 2:
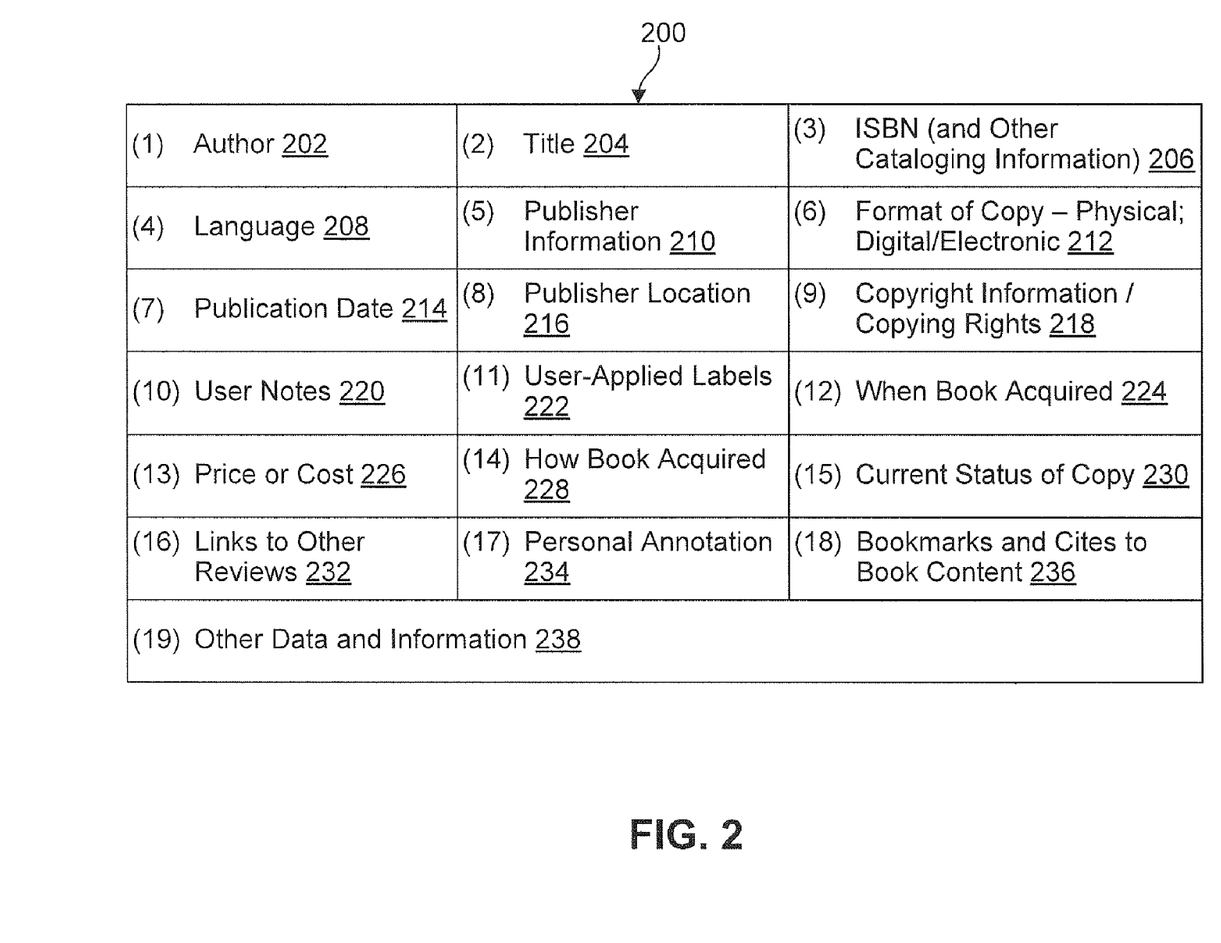
FIG. 2 is a diagram of representative book metadata.

Each book 10 contains associated book metadata 200. This book metadata 200 is an extensible set of metadata properties of or about the book 10. This book metadata can include, but is not required or limited to, the metadata properties shown in FIG. 2 of: (1) author 202; (2) title 204; (3) ISBN (or other cataloging information) 206; (4) language 208; (5) publisher information 210; (6) physical form or digital format 218; (7) publication date 214; (8) location of the publisher 216; (9) copyright infoiination and copying rights 218; (10) user notes about the book or its contents 220; (11) user applied labels used for search or creating collection hierarchy 222; (12) information about when the book was acquired 224; (13) price or cost 226; (14) information of how the book was acquired (purchased, borrowed, received as a gift, found, etc) 228; (15) current status of physical copy 122 or digitally-stored copy 124 (e.g. available, lent to another, reserved, etc) 230; (16) link(s) to other review(s) 232; (17) personal annotations 234; (18) bookmarks to specific places or parts of the book (such as specific lines/pages) 236; and (19) other data or properties of the book or annotations of the user 238.

The virtual bookshelf 100 allows the user to search 304 the Web or on-line collection using a search query 510 having search data or search metadata to identify a desired book 10. Library metadata 710 corresponding to the metadata of the physical books 122 and the digitally stored books 124 of the user (also called the physical bookshelf 116 or physical library of the user) is then searched using the search metadata 712 to determine if the desired book 10 is present in the virtual on-line bookshelf 100. If the desired book 10 is present on the virtual on-line bookshelf 100, an indication of its presence is provided, such as an image of its front and/or side covers 110 or an audible indication or sign. If the book is absent from the virtual on-line bookshelf 100, this is also indicated to the user. Additionally, the virtual bookshelf 100 can allow the user to find or obtain a copy (physical 122 or digitally stored 124) of the desired book 10 using a Web search of sources of copies.

The virtual bookshelf 100 can be a light-weight Web application. It can be deployed in a variety of scenarios, including as a module for placement on a user's personalized home-page 500 provided over the Web cloud 104 to the user. Such a scenario allows the user to select the module from a group of available modules, and then cause the module to be added on the user's personalized home-page in a form and fashion specified by the user. Since the personalized home-page 500 is resident on the server 102 of the Internet portal and is downloaded over the Web 104 to the user on demand, the module of the virtual bookshelf is not resident on the device or computer used by the user to access the Web. Another scenario is a gadget version 702 that is downloaded over the Web 104 to the device or computer 700 of the user used to access the Web 104. The gadget 702 is a form of utility program resident on the device or computer 700 of the user and is available when the browser of the user is launched. Another scenario is to have the virtual bookshelf part of a web-based service used to search for physical and digitally stored books (see 706). The user in this scenario selects the virtual bookshelf as a functionality of a customized service offering and uses it to build a virtual bookshelf 100 as part of the ordering function associated with the search of desired copies of physical 122 and digitally stored 124 books. Another scenario is to make the virtual bookshelf 100 part of a universal search capability over the Web, where the search is restricted to the books 10 in the virtual bookshelf 100 corresponding to the physical bookshelf 116 of the user. It should be noted that the virtual bookshelf 100 is not restricted to these scenarios of deployment, and encompasses all versions that allow the features, functions and operations as described herein.

The following is a sample usage scenario of the virtual bookshelf 100. Note that this scenario is representative and not restrictive.

Figure 6:
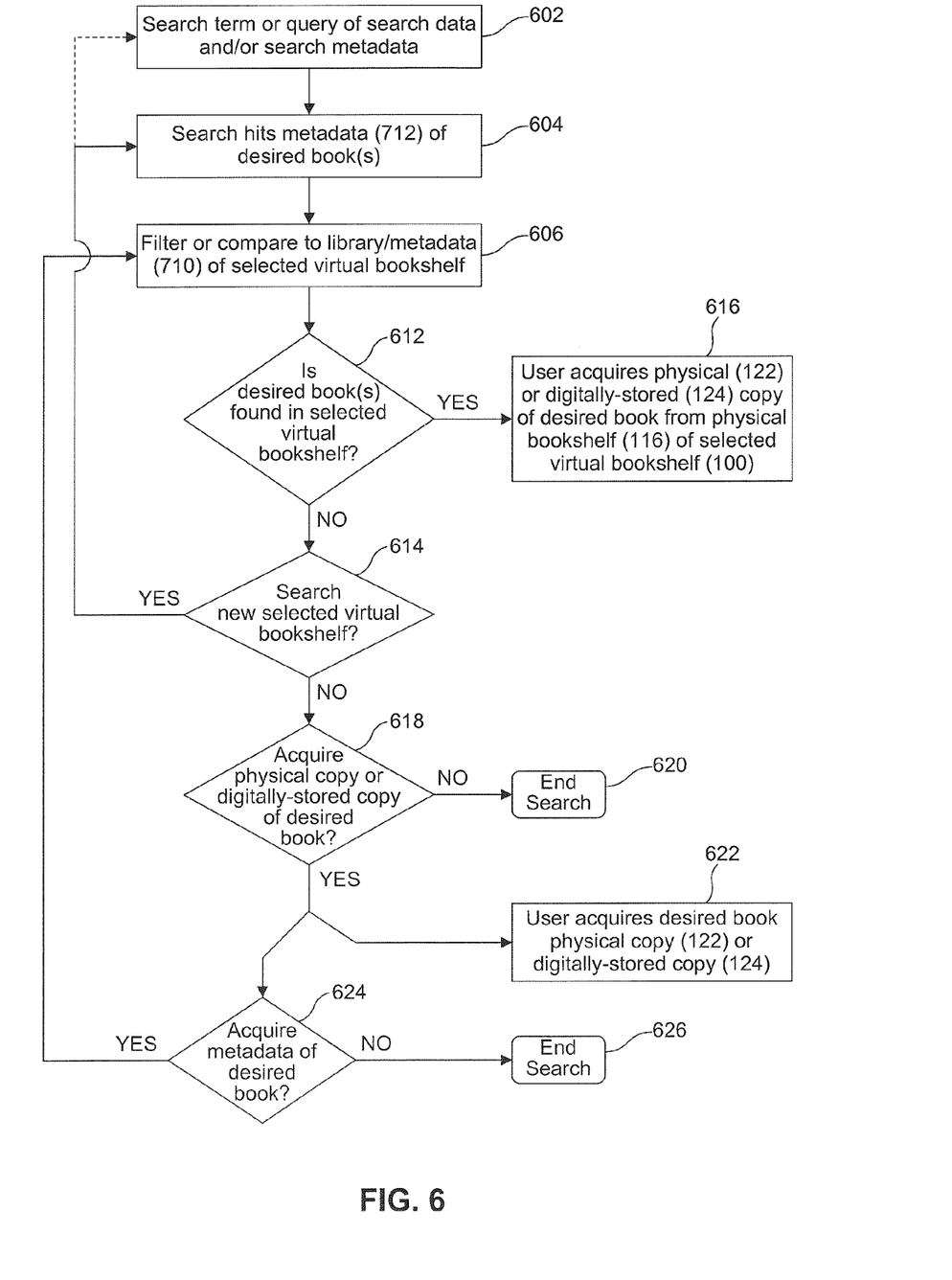
FIG. 6 is a flow chart illustrating search multiple virtual bookshelves and other on-line sources to locate and obtain a copy of a desired book.

Referring to FIG. 6, a search term or query 602 is input to the virtual bookshelf 100 to locate a desired book 10 having the information that is desired or sought or having the metadata specified. The search query 602 can use search data and/or search metadata 712. The result of the search query 602 is to develop or obtain in a step 604 search metadata 712 corresponding to a desired book 10. The search metadata 712 is then compared in a step 606 to the library metadata 710 corresponding to the physical books 122 and digitally stored books 124 contained in the virtual bookshelf 100 of the user to determine if the desired book 10 is present on the virtual bookshelf 100. If the desired book 10 is present on the virtual bookshelf 100 of the user, the match as indicated by decision block 612 is presented to the user in the faun of a display 714, which can include but is not limited to a picture 110 of the book cover salient metadata and user annotations (if any) or in an audible mode. In this way, the user knows that she has the desired book 10 on her virtual bookshelf 100 and can now locate the corresponding physical copy 122 or digitally-stored copy 124 for use, as indicated by block 616.

On the other hand, if the desired book 10 is found not to be present (absent) from the virtual bookshelf 100 being searched, the electronic search 304 can be expanded, if desired by the user, as indicated by a decision block 614. For example, but not limiting to the scope of the virtual bookshelf 100, the search can be expanded to universal book search engines. One such example of a presently available universal book search engine is Google Books®, but the virtual bookshelf 100 encompasses any presently available or future developed Web-based or other electronic book search engine. Another representative example of how the search can be expanded by the user to find/locate the desired book is to use a full Web search. Once the desired book 10 is located by such additional search, the virtual bookshelf 100 as indicated by a decision block 618 can provide the ability using an interface icon, button or other GUI or other user interactive facilities or device either to purchase or obtain a physical copy 122 or digitally stored copy 124 of the desired book 10 either from a bookstore or other point of sale or from a lending library (see 706 and 708 of FIG. 7). Once the desired book 10 is obtained from such a source, as indicated by block 622, its metadata as indicated by decision block 624 can be added to the library metadata 710 of the virtual bookshelf 100 automatically and seamlessly, thus allowing the user to build the virtual bookshelf 100 to reflect this new book 10.

Figure 7:
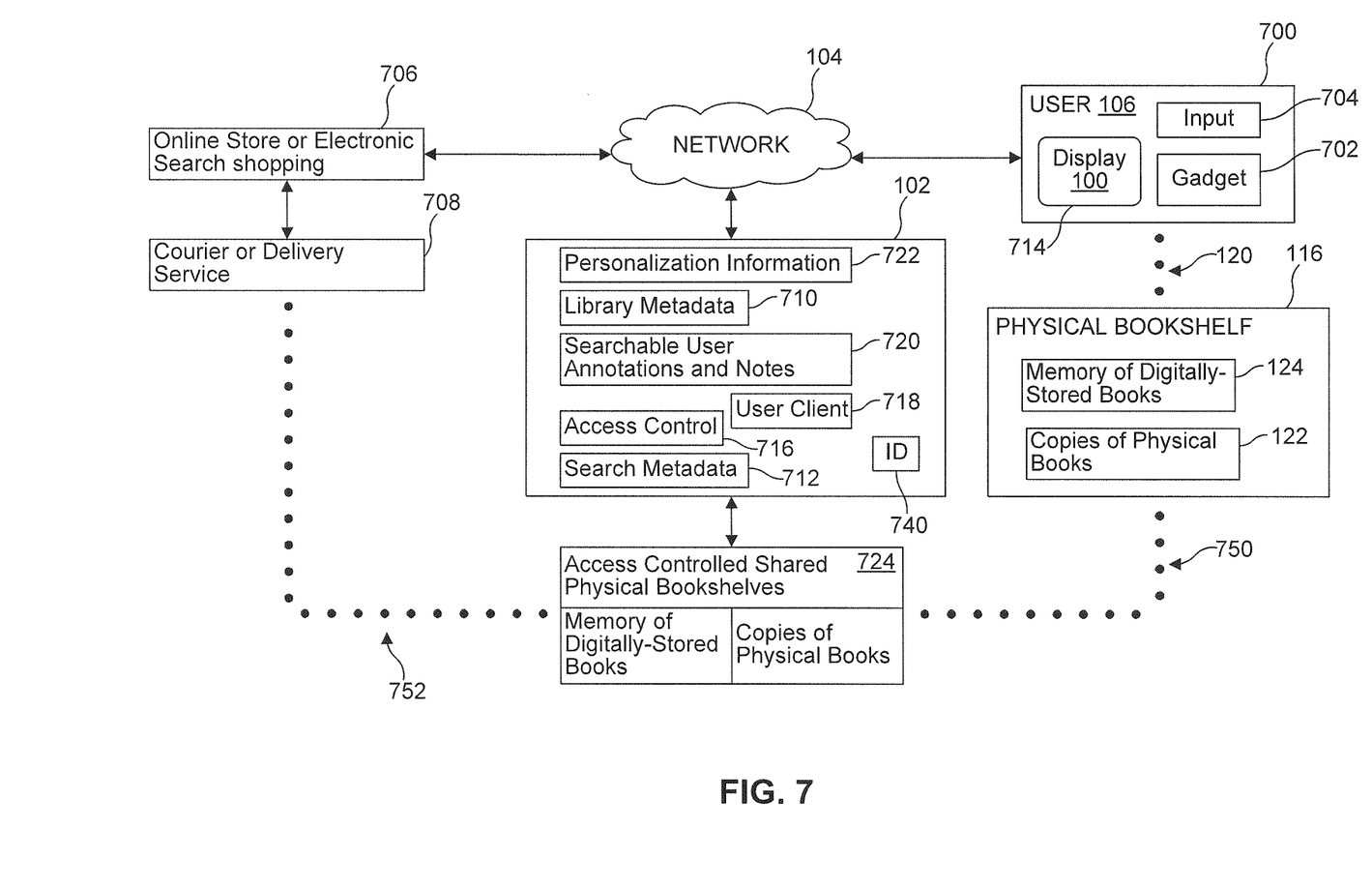
FIG. 7 is a diagram of the network environment and physical environment incorporating a virtual bookshelf according to an example of the present invention.

Another aspect of the virtual bookshelf 100 is that the search can be expanded or widened in a number of ways, as shown representatively in FIGS. 5 and 7. For example, the search for the desired book 10 can be expanded to shared virtual bookshelves, such as the virtual bookshelf of a department library 520 or the bookshelf of a friend or colleague 522 that has allowed for such access to the user. In other words, the search is expanded or widened to other virtual bookshelves that are specified and to which access is granted. This allows for the creation of on-line virtual bookshelf communities. Moreover, this expanded search to other virtual bookshelves can further allow for the user to borrow, buy or trade for the desired book.

Note that the metadata 712 of the desired book comes primarily from online sources such as Google Book Search® 528. As the user locates a desired book 10 and obtains its metadata (indicated by decision block 624) that is added to the library metadata 710 of the virtual bookshelf, the user can expand this metadata to include additional metadata as shown in FIG. 5, such as annotations about the price of the book 226, where it was obtained 228, from whom it was obtained, why it was obtained, when it needs to be returned (if it is on loan) 230, and any other data deemed pertinent by the user, for example, user notes 220 made while working with the book material. As indicated by block 720, this makes notes made by the user in the context of a given book available for later searches. This produces a form of automatic build of the virtual bookshelf 100 as new desired books 10 are added. Moreover the user can remove books for the virtual bookshelf 100 for any reason, such a sale, disposal, loss, damage or trade of the physical 122 or digitally stored copy 124 of the book. The user can also specify access rights 716 to third party users of some or all of the contents of her virtual bookshelf 100.

The books that make up the virtual bookshelf 100 can be displayed visually 714 to the user when a desired book 10 is located on the virtual bookshelf 100 in any manner specified. For example, the presence of the desired book 10 on the virtual bookshelf 100 can be indicated by briefly displaying, as shown in block 308, the book cover salient metadata and user annotations or other information. Alternatively, the match can be shown by other visual indicator 554 or 560 or audible indicator or representation. The match, for example, can be audible, if the user is sight impaired or blind or does not want to rely on visual queues.

The build of the inventory of the books on the virtual bookshelf 100 is fashioned and structured in recognition of human nature. Human beings as a whole do not like to take the time to inventory the physical books 122 and digitally stored books 124 that they have in their possession or own. Such an inventory task is time consuming, tedious, and often inexact and requires several steps to complete. The net result is procrastination and failure to complete the task. The virtual bookshelf 100 makes this process routine, seamless and easy to complete. When a user identifies a desired book 10 from a Web search 304, she can obtain a physical 122 or digitally stored 124 copy of it over the Web by ordering or loan or by gaining access to other virtual bookshelves or physical libraries. The metadata of the desired book can be obtained electronically as an outgrowth of the search as indicated by decision block 624 and added and annotated to the metadata of the library metadata 710 that makes up the virtual bookshelf 100 of the user. This results in the ease and seamlessness of building the virtual bookshelf 100. Moreover, the user from time to time can add an already owned or possessed physical 122 or digitally stored 124 book to the virtual bookshelf 100 by performing a Web search on that book 10 to obtain the needed metadata for the library metadata 710 of the virtual bookshelf 100. This metadata obtained from the Web search can be augmented and annotated to reflect specific information or content of the user so that such additional metadata becomes part of the library metadata that can be used by the user or others permitted access to the user's virtual bookshelf for their metadata searches, as indicated by block 720. Thus, over time, the user builds her virtual bookshelf 100 in the order of use and need, and not as part of a tedious and time consuming process of having to inventory an already existing library of physical 122 and digitally stored 124 books.

It should be noted that the virtual bookshelf 100 can be implemented using hardware and/or software in any fashion to provide the desired features, functions, operations and attributes desired to perform for the user the virtual bookshelf functionality. A representative system for implementing the virtual is as follows. It is representative and not restrictive.

As shown in FIG. 7, a server 102 in the backend of the computer-based system hosts, for example but not by restriction, the personalization information 722, library metadata 710, searchable user annotations and notes 720, and access control information 716 that makes up or defines the virtual bookshelf 100 of the user. Other related information and data associated with the virtual bookshelf can be hosted as well by server 102.

In addition, a user client 718 in the form of a client software module acts to present a search interface 500 to the user that enables specific features, functions and operations. Note that the user client 718 can reside with server 102 in one implementation and be connected by Internet cloud 104 to a user client 106, as shown in FIG. 1, or alternately to a gadget 702 that is down loaded by the user client 718 to the user to reside at the user device 106, as shown in FIG. 7.

Regardless of the location of the user client 718, the client software module presents a search interface 500 to the user that enables, for example but not limitation, search queries 304 against information sources available on the Internet (world wide web or www) as well as other available information repositories. As representative examples only as shown in FIG. 5, these information sources and repositories can include, for example: shared virtual bookshelves of friends or colleagues 522; group bookshelves 520; information on the world wide web (www) 534; results of scanning books available via Google Books® 528 and others electronic repository; electronic libraries available to the organization of which the user is associated 524 and 526; other sources of electronic information having digitized works (digitally stored books) such as on line booksellers 530, specialized online databases and proprietary database collections 532.

The user using a specified search query input in search query window 510 causes the client software module 740 to conduct a search through the desired information sources and repositories. The search may result in one or more search hits, as indicated representatively in FIG. 5 by hits 550, 552, 556, 558, 562. The search hit(s) is/are presented to the user, and are further identified if it/they correspond to desired book(s) that the user owns in either a physical copy 122 or a digitally stored copy 124, as indicated by presence indicators 554 and 560, for example. When the search hit corresponds to a desired book 10 that the user knows she owns a physical copy 122 or digitally stored copy 124 but which is not shown in the user's virtual bookshelf, the user using the client software module 740 in the virtual bookshelf can drag and drop the visual icon of the desired book 10 into her virtual bookshelf 100. This drag and drop results in her virtual bookshelf 100 being populated with the appropriate library metadata 710. In this fashion, the user can start with an empty virtual bookshelf which becomes progressively populated over time by the use of the virtual bookshelf system and method to add desired books 10 that the user owns a physical copy 122 or digitally stored copy 124 or has authorized access 724 to such a copy in another collection or library.

Note that the identification of desired books 10 in the virtual bookshelf 100 can be in any manner or form desired, including providing a characteristic visual icon, such as a picture of the front cover or side cover of the desired book 110, audible indicator or queue, or tactile indicator.

In the event that the search query 510 identifies a desired book not in the user's virtual bookshelf 100, the client software module 740 can provide the necessary facilities to enable the desired book 10 to be acquired. Many different approaches to acquiring the desired book are contemplated by the virtual bookshelf 100. For example, the book 10 can be located electronically over the Internet from on-line booksellers 706 such as Amazon®, which can then ship the desired book to the user using a delivery service, courier or mail service 708. Another approach is to obtain the desired book 10 over the Internet in a digitally stored version 124 using a download process. Another approach is to borrow the desired book either in physical or digitally stored form from a library or collection, such as a regional lending library, where the user has access rights 724. The virtual bookshelf 100 contemplates the functionality of automatically adding the desired book 10 to the virtual bookshelf 100 with the purchasing or borrowing function by acquiring the metadata of the desired book over the Internet, as indicated by decision block 624 in FIG. 6, and block 560 in FIG. 5.

The virtual bookshelf 10 further includes the necessary facilities for the user to add notes in the form of electronic annotations to desired books that are added to the virtual bookshelf, as indicated by block 720. Such annotations can include, but are not limited to, search queries that were performed to obtain the hit that produce the identification of the desired book 10. It is noted that such notes of successful searches producing desired books can accelerate similar search tasks by the user in the future.

The system components discussed above can be implemented as software components.

The server 102 can have software components that store necessary information for each user for realizing an interactive, virtual bookshelf. For example, a software module 740 can be stored in server 102 and provide user identity and authentication. A software module 722 can be stored in server 102 and provide personalization information. A software module 716 can be stored in server 102 and provide access control lists. A software module 712 can be stored in server 102 and provide a search metadata store as described herein. Note that these may be custom software components or can be built out of standard software components already in use for providing various on-line services, such as Google® services.

The search interface 500 provided to the user by server 102 over the Internet cloud 104 or by the Google® gadget 702 stored on the user computer or device 700 can be of any layout and provide any desired features and functions. For example, it can be the search interface of the current Google Search®. It can also be a customized search interface created by the user using buttons and other graphical devices that can be selected during the configuration phase of such search interface.

Figure 3:
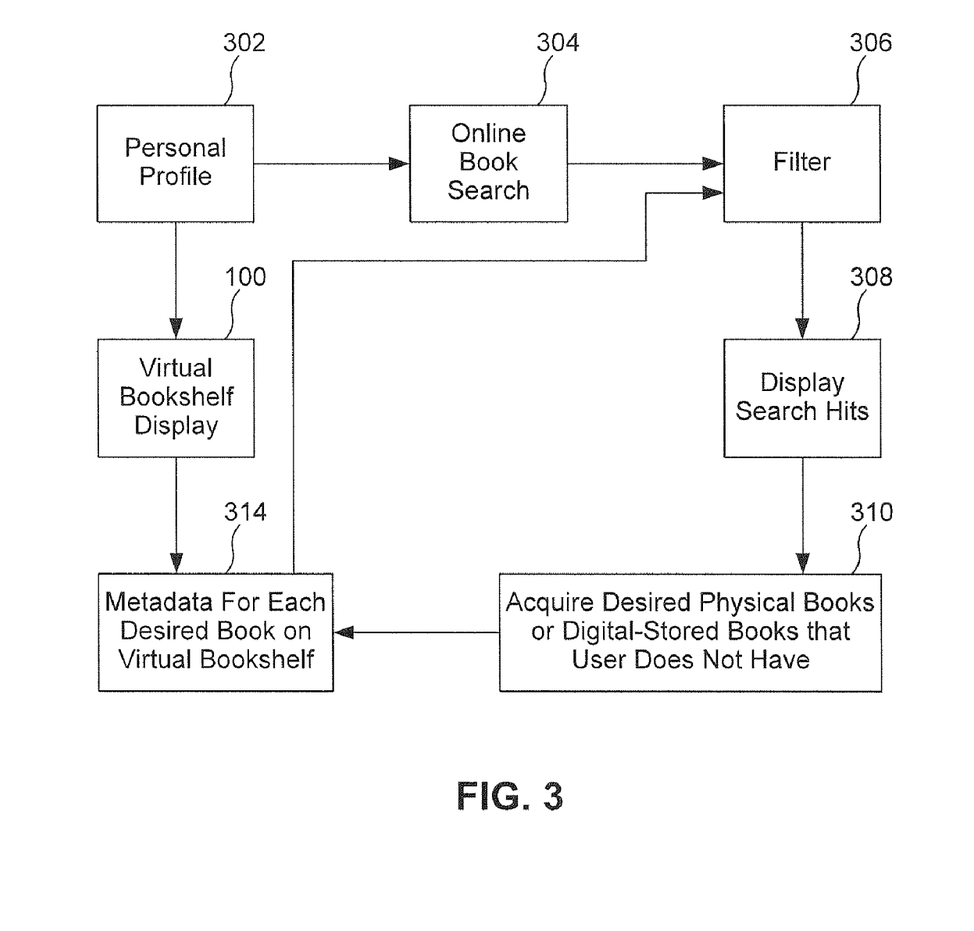
FIG. 3 is a flow diagram showing the operation of a virtual bookshelf according to an embodiment of the present invention.

Referring now to FIG. 3, a virtual bookshelf filter 306 is a software component that filters and annotates a result set from a search query 304 with the appropriate metadata 200 from the virtual bookshelf to determine if the desired book 10 is on the virtual bookshelf 100. As an example, when a search hit(s) from search query 304 corresponds to a desired book(s) 10 on the virtual bookshelf 100, this filter 306 is responsible for providing an interactive indication 308 to the user. This interactive indication can be, for example only, a display of a cover image of the desired book 10 along side the search hit that is displayed to the user (see FIG. 5). Moreover, the search hit can be annotated with additional metadata that enables the display of the search hit to be styled in a desired, distinctive fashion. This stylization of the search hit allows the user to readily identify that the search hit corresponds to a desired book on the virtual bookshelf 100, as represented in FIG. 5. Different types of stylization can be provided to indicate if the desired book 10 is on a third party virtual bookshelf that the user has access rights to for searching. Note that the stylization can be in any form or fashion desired, such as a font change(s) in a visual presentation, the addition of another visual indicator, changes in aural emphasis when the search hit is read aloud, or other customization specified by the user.

As discussed, the virtual bookshelf 100 provides the functionality of acquiring desired books that are not present on the user's virtual bookshelf but can be obtained for other sources by download or electronic loan or can be purchased or borrowed. A software component called AcquireBook 310 enables the user to acquire the desired books that are not on the user's virtual bookshelf but which appears on the list of search hit(s). For example, in one version of AcquireBook 310, it can help the user buy the book from any number of online sources, either run by Google® or by external partners or competitors (see block 706). In another version of AcquireBook 310, it can search other sources of books that the user has access rights to and obtain the desired book by loan or exchange. In either version, the AcquireBook 310 can automatically add the desired book that is acquired to the virtual bookshelf for visual or aural display and add associated metadata to the library metadata store 710 for that desired book 10.

The virtual bookshelf 100 allows the user to create or join a virtual community of other virtual bookshelves. In this fashion, virtual lending libraries and cooperatives can be created online. It also allows for all types of sharing arrangements, such as a professor having a virtual bookshelf accessible to all of the students of a course so that the assigned course readings are on the virtual bookshelf for the course and contained physically in a university lending library or course bookshelf. A similar approach can be used for business and technical teams that span several virtual bookshelves of physical collections of books spaced apart geographically or stored electronically on different servers. A software component AccessControl 716 allows each user to selectively provide access rights to other users so that they can control and specify the access and sharing of all or parts of their virtual book shelf 100 to specified users. Different access rights and levels can be specified by the user of a virtual bookshelf to 3rd parties based on individual or group levels.

Categories or other group designation of books on the virtual bookshelf can be provided to the user with a software component AddLabels 516, 517, 518 of FIG. 5. AddLabels 516, 517, and 518 enables the user to add labels to books on her virtual bookshelf 100. Note that the user can add any number of labels to a given book 10 on her virtual bookshelf 100. The labels can be used to advantage to obtain selective projections of the virtual bookshelf 100. A selective projection is to restrict the books displayed on the virtual bookshelf to those having the label(s) specified. In other words, the selective projection is a type of filter using the specified label(s) to restrict the books 10 displayed to the user only to those meeting the label(s) criteria specified. A user can use her labels to create hierarchies in her virtual bookshelf 100, or as a mechanism to allow for searching over a community of virtual bookshelves using e-mail mechanisms, such as GMail®.

Referring again to FIG. 3, a block information flow diagram of the virtual bookshelf 100 is shown. A personal profile block 302 of the user is used by the user in on-line book search block 304 to make a search for desired book(s) 10 using a search query. Hits from the search from block 304 are provided to a filter block 306, which also is provided from a metadata block 200 with the metadata of the books on the virtual bookshelf 100. Filter block 306 determines if the hits from search are present in the virtual bookshelf 100 and displays these results to the user in a display block 308. If the desired books 10 are not present on the virtual bookshelf 100, the user can obtain them through purchase or loan using an acquire block 310. Once the desired book 10 is obtained, its metadata can be provided to the metadata block 200 either by the user (see block 560 of FIG. 5) or automatically.

Figure 4:
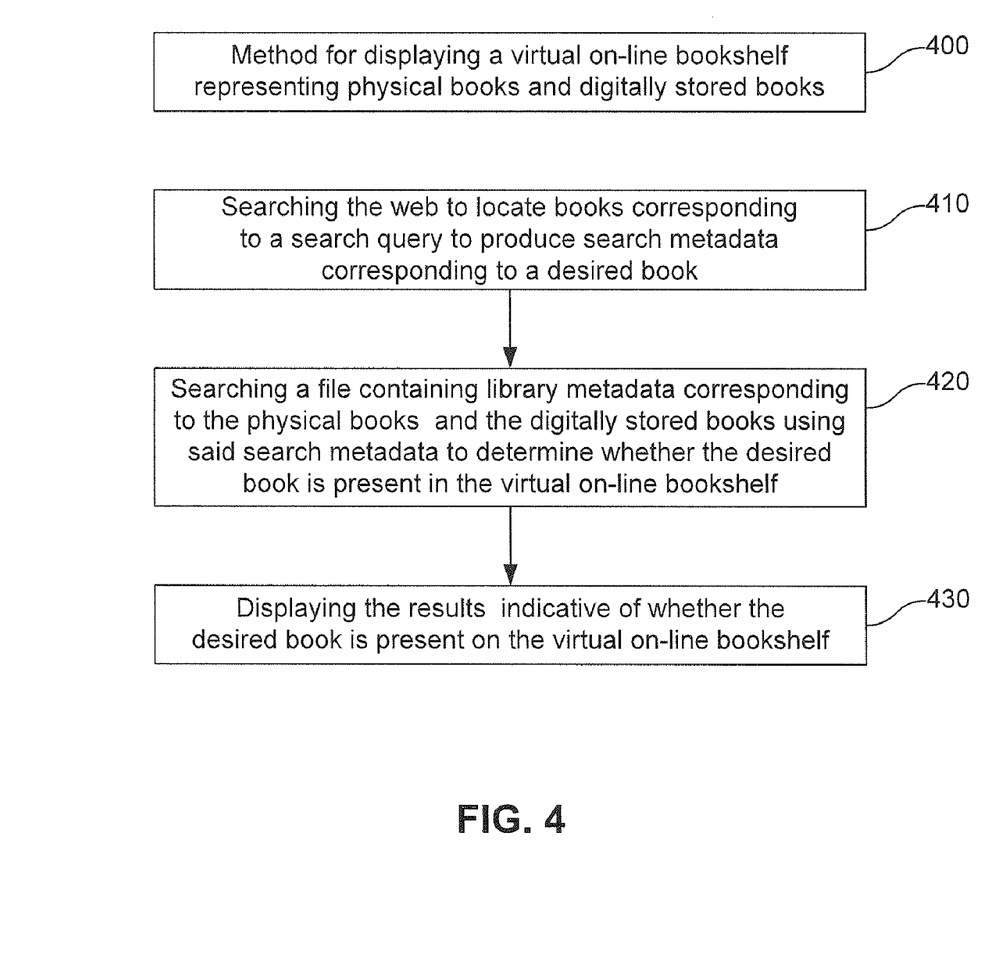
FIG. 4 is a method for displaying a virtual bookshelf according to an embodiment of the present invention.

FIG. 4 is a method 400 for displaying a virtual bookshelf according to another embodiment of the present invention (steps 410-430). In step 410, a search of the web is made to locate books corresponding to search query. This produces search metadata corresponding to a desired book. A file containing library metadata is then searched (step 420). This library metadata can correspond to the physical books and the digitally stored books using the search metadata to determine whether the desired book is present in the virtual bookshelf. Finally, results indicative of whether the desired book is present on the virtual bookshelf can be displayed (step 430).

CONCLUSION

Exemplary embodiments of the present invention have been presented. The invention is not limited to these examples. These examples are presented herein for purposes of illustration, and not limitation. Alternatives (including equivalents, extensions, variations, deviations, etc., of those described herein) will be apparent to persons skilled in the relevant art(s) based on the teachings contained herein. Such alternatives fall within the scope and spirit of the invention.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

What is claimed is:

1. A computer-implemented method for realizing a virtual bookshelf, comprising:
   initiating a search query to locate one or more desired books in either physical or soft copy digital form;
   producing search metadata corresponding to the one or more desired books;
   filtering metadata corresponding to books contained within the virtual bookshelf with the search metadata to determine whether the one or more desired books is present in the virtual bookshelf, wherein the virtual bookshelf comprises information representing books, in either physical or soft copy digital form, acquired by and particular to a user; and
   outputting results of the filtering indicative of whether the one or more desired books is present on the virtual bookshelf.

2. The computer-implemented method of claim 1, further comprising:
   obtaining metadata of the one or more desired books from the web; and enabling the user of the virtual bookshelf to add to the metadata of the one or more desired books in the virtual bookshelf.

3. The computer-implemented method of claim 1, wherein the metadata includes one or more user-annotatable fields.

4. The computer-implemented method of claim 1, further comprising:
enabling the user of the virtual bookshelf to modify the metadata of the one or more desired books in the virtual bookshelf.

5. The computer-implemented method of claim 1, further comprising:
enabling the user of the virtual bookshelf to add a label to the metadata of the one or more desired books, whereby the label can be used for searching or for providing a hierarchy to the books on the virtual bookshelf.

6. The computer-implemented method of claim 1, further comprising:
allowing the user to expand the search query to a specified virtual bookshelf that the user has access rights to search.

7. The computer-implemented method of claim 1, further comprising:
allowing the user to expand the search query to a specified on-line library.

8. The computer-implemented method of claim 1, further comprising:
allowing the user to expand the search query to a specified on-line search service.

9. The computer-implemented method of claim 1, further comprising:
allowing the user to expand the search query to a specified on-line subscription service.

10. The computer-implemented method of claim 1, further comprising:
allowing the user to expand the search query to virtual bookshelves of an on-line community that the user has access rights to search.

11. The computer-implemented method of claim 1, further comprising:
enabling the user of the virtual bookshelf to add either a physical or a soft copy digital form book, and associated metadata of the book to the virtual bookshelf.

12. The computer-implemented method of claim 11, further comprising:
enabling the user that added the book to control the access rights of other users to the added book.

13. The computer-implemented method of claim 1, wherein the user is an owner of the one or more desired books.

14. The computer-implemented method of claim 1, wherein the user is a borrower of the one or more desired books.

15. The computer-implemented method of claim 1, further comprising:
providing a capability to the user, after outputting the results of the filtering that indicates that the desired book is absent on the virtual bookshelf, and
searching the web to locate an available copy of a book in either physical or soft copy digital form that corresponds to the one or more desired books.

16. A computer-implemented client based method for realizing a virtual bookshelf, comprising:
generating, on a client based system, a search query specifying one or more desired books, wherein the one or more desired books exist in either physical or soft copy digital form;
sending the search query to a server;
producing search metadata corresponding to the one or more desired books;
filtering metadata corresponding to books contained within the virtual bookshelf with the search metadata to determine whether the one or more desired books is present in the virtual bookshelf; and
receiving, from the server, output indicating whether the one or more desired books is present on the virtual bookshelf, wherein the virtual bookshelf comprises information representing books, in either physical or soft copy digital form, acquired by and particular to a user.

17. The computer-implemented method of claim 16, further comprising:
providing a capability to the user of purchasing or licensing an available copy of the one or more desired books, either in physical or digitized format, over the web.

18. The computer-implemented method of claim 16, wherein the metadata includes one or more user-annotatable fields.

19. The computer-implemented method of claim 16, further comprising:
providing a capability to the user of having an available copy of the one or more desired books purchased over the web and provided to the user by courier or other delivery service.

20. The computer-implemented method of claim 16, further comprising:
providing a capability to the user of having an available copy of the one or more desired books licensed over the web and provided to the user electronically over the web in a digitally-stored format.

21. A computer-implemented method for realizing a virtual on-line bookshelf representing physical and digitally stored books, comprising:
generating, using a computer-based system, a search query to produce search metadata corresponding to one or more desired books;
filtering the search metadata by searching a file containing metadata corresponding to a physical or digitally stored book using the search metadata to determine whether the desired one or more books is present or absent in a virtual on-line bookshelf, wherein the virtual on-line bookshelf comprises information representing physical and digitally stored books acquired by and particular to a user; and
after determining that the desired one or more books is absent in the virtual on-line bookshelf, searching the web to locate a copy of a physical or digitally stored book corresponding to the desired one or more books.

* * * * *